(12) United States Patent
Im

(10) Patent No.: US 11,450,878 B2
(45) Date of Patent: Sep. 20, 2022

(54) METHOD FOR MANUFACTURING CYLINDRICAL THREE-ELECTRODE CELL, AND CYLINDRICAL THREE-ELECTRODE CELL MANUFACTURED THEREBY

(71) Applicant: LG CHEM, LTD., Seoul (KR)

(72) Inventor: I Reh Im, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 16/964,820

(22) PCT Filed: Aug. 26, 2019

(86) PCT No.: PCT/KR2019/010860
§ 371 (c)(1),
(2) Date: Jul. 24, 2020

(87) PCT Pub. No.: WO2020/045928
PCT Pub. Date: Mar. 5, 2020

(65) Prior Publication Data
US 2021/0066742 A1   Mar. 4, 2021

(30) Foreign Application Priority Data

Aug. 29, 2018 (KR) .................. 10-2018-0101846

(51) Int. Cl.
*H01M 10/04* (2006.01)
*H01M 50/538* (2021.01)
(Continued)

(52) U.S. Cl.
CPC ....... *H01M 10/0422* (2013.01); *C09J 133/14* (2013.01); *C09J 163/00* (2013.01);
(Continued)

(58) Field of Classification Search
CPC ......... H01M 10/0422; H01M 10/0431; H01M 10/049; H01M 10/48; H01M 50/538; H01M 50/202
See application file for complete search history.

(56) References Cited

U.S. PATENT DOCUMENTS

2012/0315513 A1* 12/2012 Ro ..................... H01M 50/166
429/53
2013/0009604 A1 1/2013 Bhardwaj et al.

FOREIGN PATENT DOCUMENTS

CN 101464498 A 6/2009
CN 204165929 U 2/2015
(Continued)

OTHER PUBLICATIONS

EPO machine generated English translation of KR-2016-0039474-A (Year: 2016).*
(Continued)

*Primary Examiner* — Christopher P Domone
*Assistant Examiner* — Kimberly Wyluda
(74) *Attorney, Agent, or Firm* — Morgan, Lewis & Bockius LLP

(57) ABSTRACT

A method for manufacturing a cylindrical three-electrode cell, according to the present invention, can comprise the steps of: preparing a cylindrical can in which an electrode assembly is accommodated; manufacturing a reference electrode assembly by coupling lithium metal to one side of a reference electrode lead; separating a cap assembly coupled to the upper end of the cylindrical can; inserting the reference electrode assembly such that the lithium metal is inserted in the electrode assembly and the one side of the reference electrode lead is withdrawn to the outside of the cylindrical can; coupling the separated cap assembly to the opened upper end of the cylindrical can; mounting a holder so that same encompasses the side of the cap assembly and
(Continued)

the end part of the side of the cylindrical can; and injecting an adhesive into the holder, and then curing same.

18 Claims, 10 Drawing Sheets

(51) Int. Cl.
  *H01M 10/48* (2006.01)
  *H01M 50/202* (2021.01)
  *C09J 133/14* (2006.01)
  *C09J 163/00* (2006.01)
(52) U.S. Cl.
  CPC ..... *H01M 10/049* (2013.01); *H01M 10/0431* (2013.01); *H01M 10/48* (2013.01); *H01M 50/538* (2021.01); *H01M 50/202* (2021.01)

(56) References Cited

FOREIGN PATENT DOCUMENTS

| CN | 106058302 A | | 10/2016 | |
|---|---|---|---|---|
| CN | 106099164 A | * | 11/2016 | |
| CN | 106099164 A | | 11/2016 | |
| CN | 107607873 A | | 1/2018 | |
| JP | 2015-220044 A | | 12/2015 | |
| KR | 10-2010-0075913 A | | 7/2010 | |
| KR | 10-2013-0128030 A | | 11/2013 | |
| KR | 10-1575870 B1 | | 12/2015 | |
| KR | 20160039474 A | * | 4/2016 | |
| KR | 10-2016-0049680 A | | 5/2016 | |
| KR | 10-1710655 B1 | | 2/2017 | |
| KR | 10-2017-0043761 A | | 4/2017 | |
| KR | 10-1739625 B1 | | 5/2017 | |
| KR | 10-1804512 B1 | | 1/2018 | |
| KR | 10-2018-0080798 A | | 7/2018 | |
| KR | 10-2018-0082785 A | | 7/2018 | |
| WO | WO-2015040684 A1 | * | 3/2015 | .......... H01M 10/058 |

OTHER PUBLICATIONS

EPO machine generated English translation of CN-106099164-A (Year: 2016).*
EPO machine generated English translation of WO-2015-040684-A1 (Year: 2015).*
EPO machine generated English translation of Jp 2015-220044A (Year: 2015).*
International Search Report (with partial translation) and Written Opinion issued in corresponding International Patent Application No. PCT/KR2019/010860, dated Dec. 2, 2019.
Office Action issued in corresponding Korean Patent Application No. 10-2018-0101846 dated Mar. 28, 2022.

* cited by examiner

[Fig. 1]
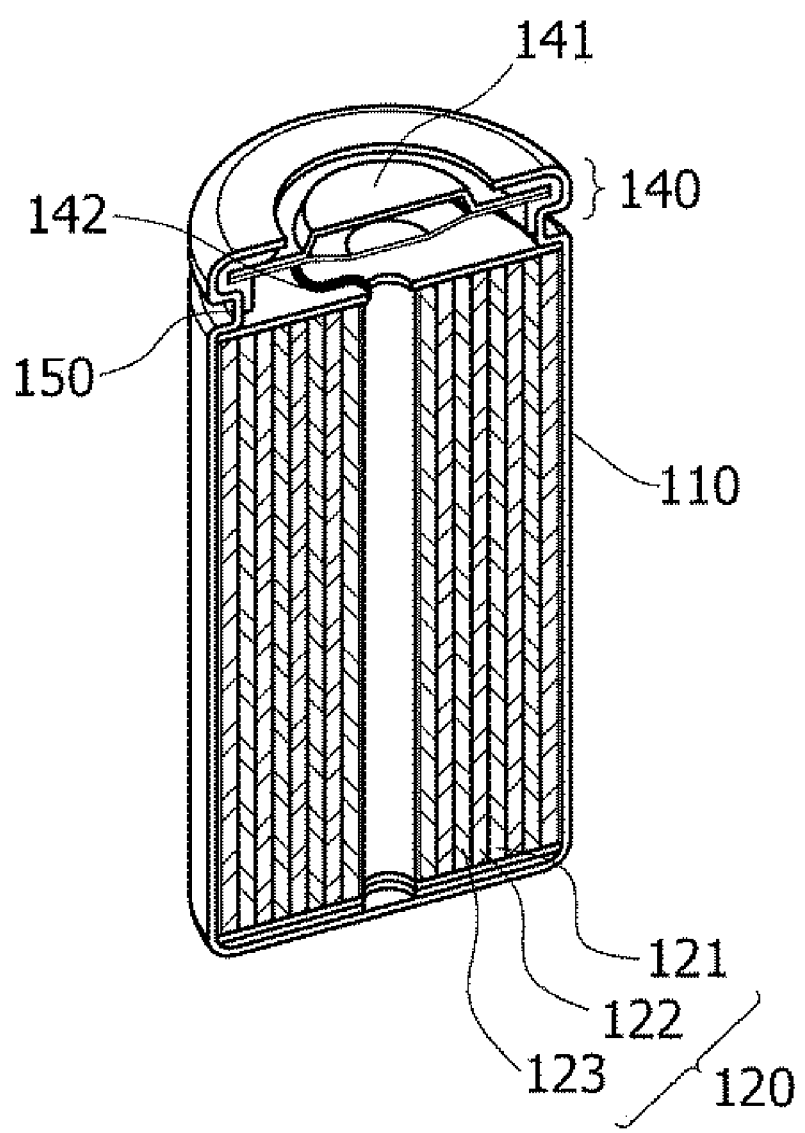

[Fig. 2]
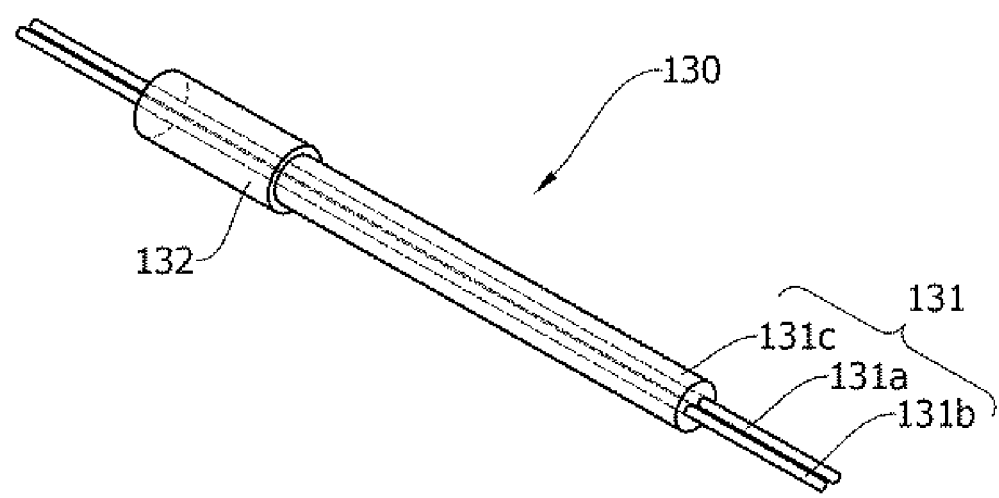

[Fig. 3]
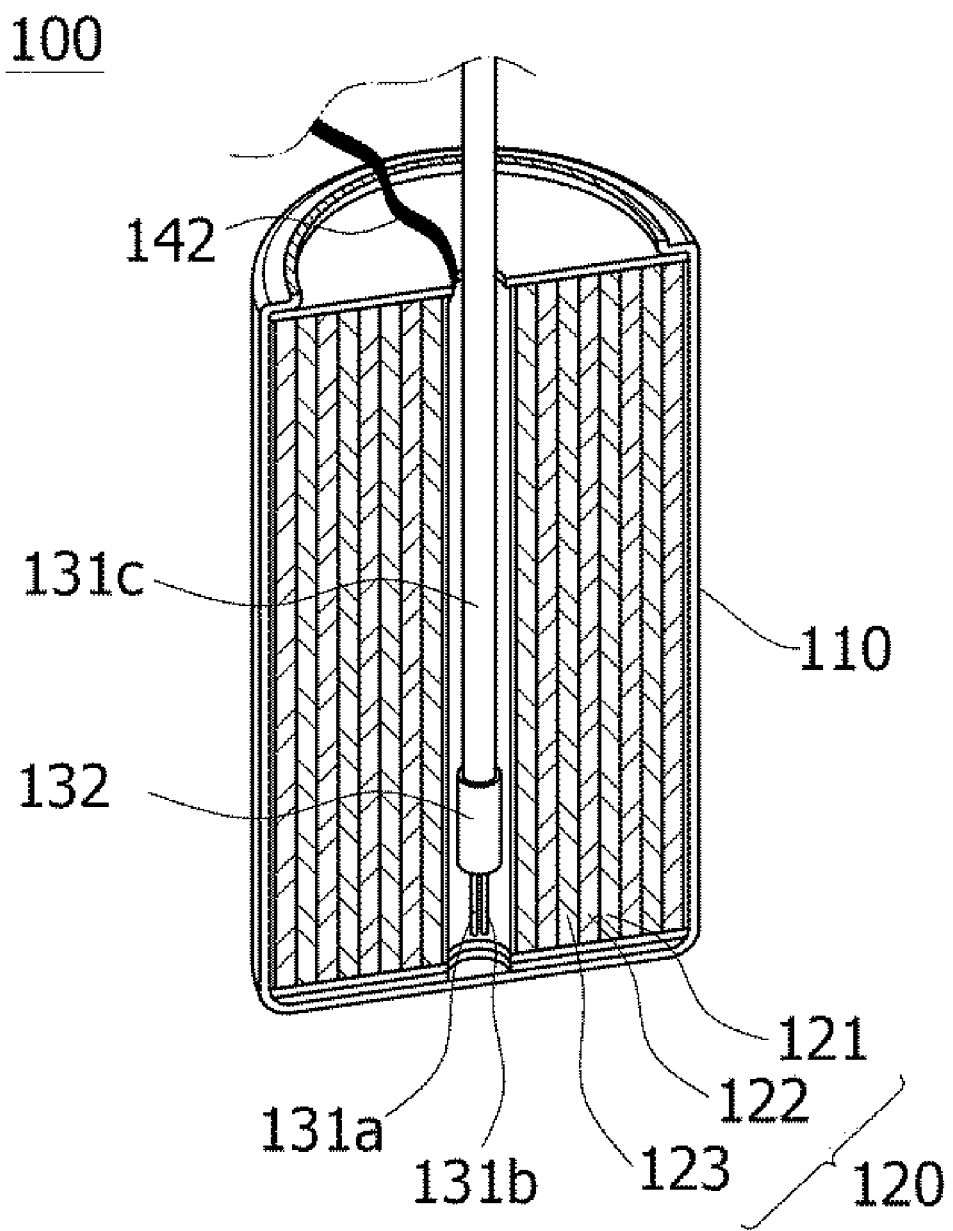

[Fig. 4]
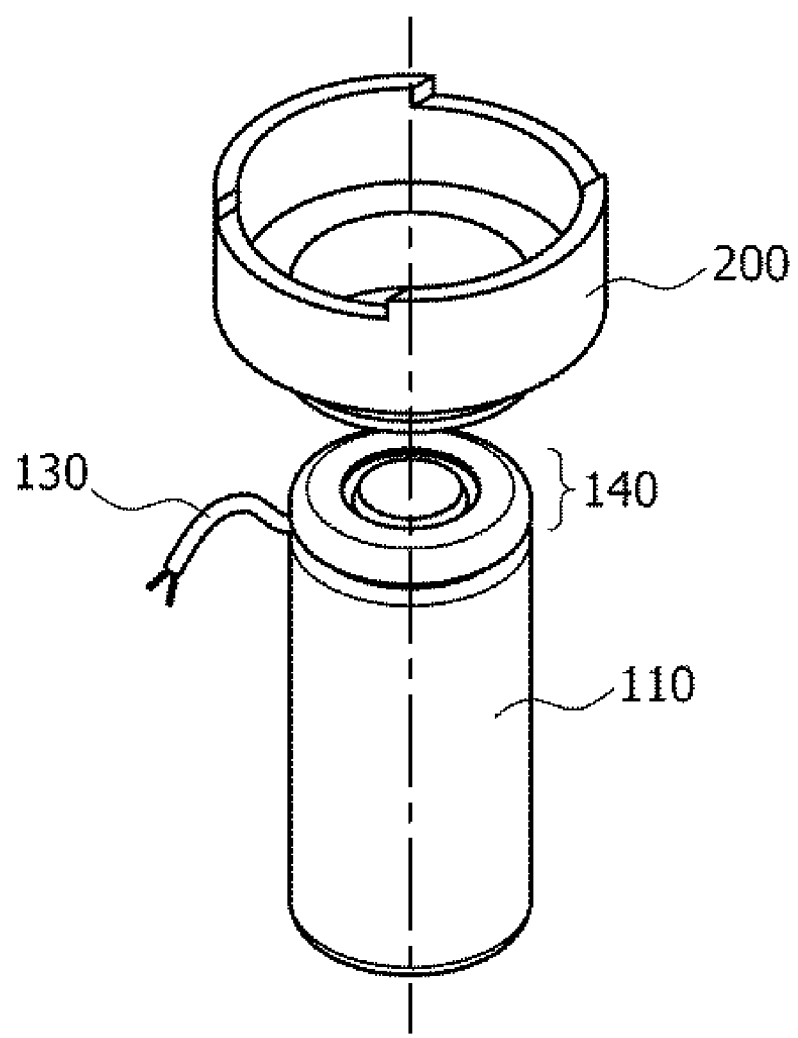

[Fig. 5]
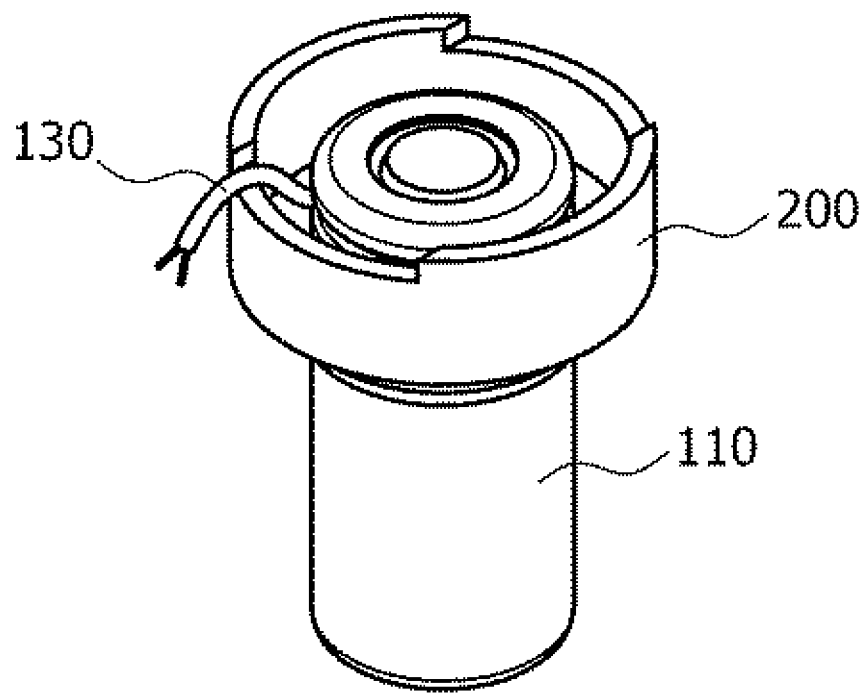

[Fig. 6]
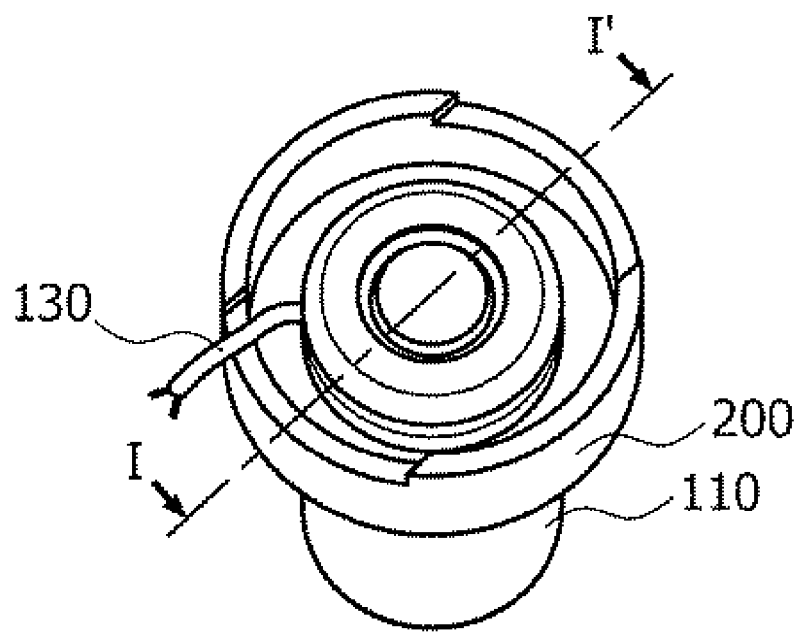

[Fig. 7]
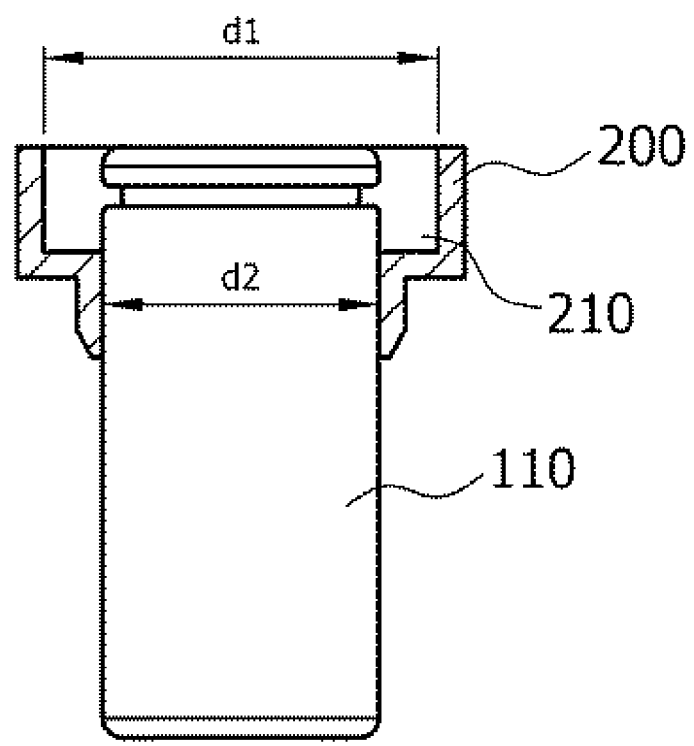

[Fig. 8]
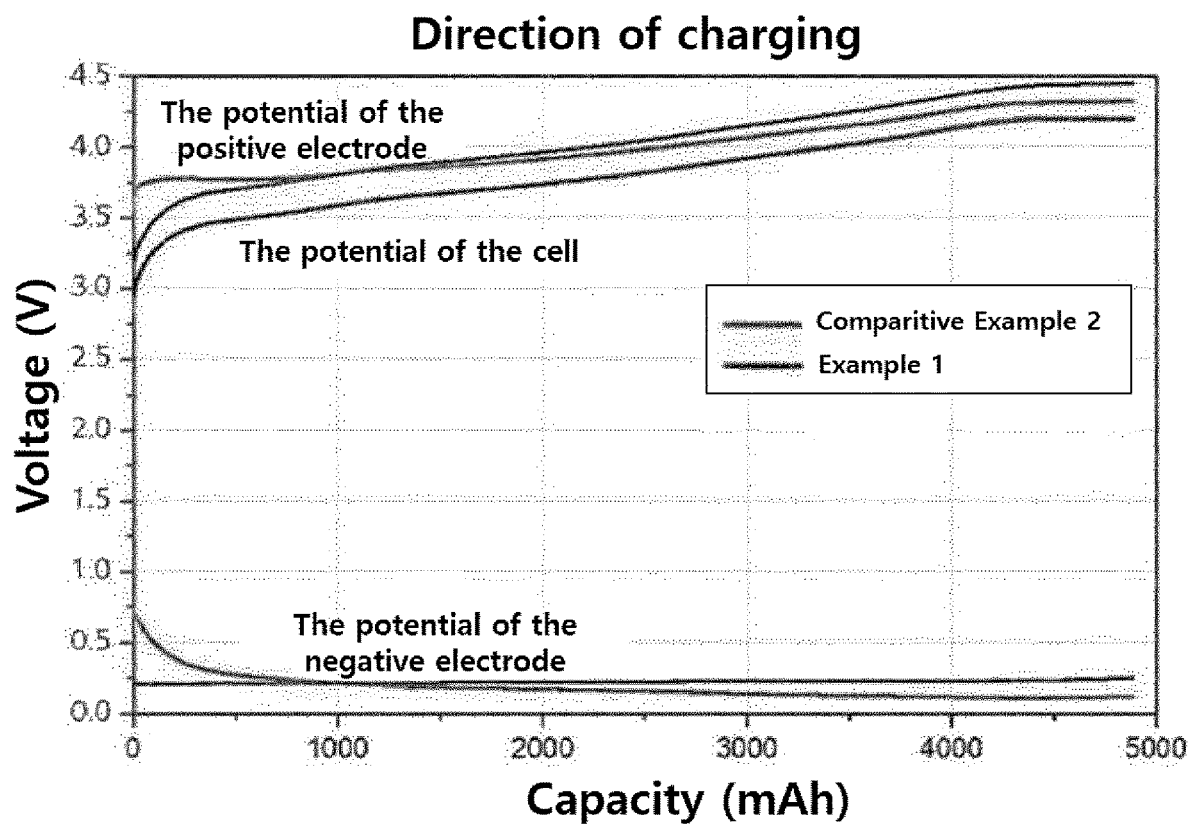

[Fig. 9]
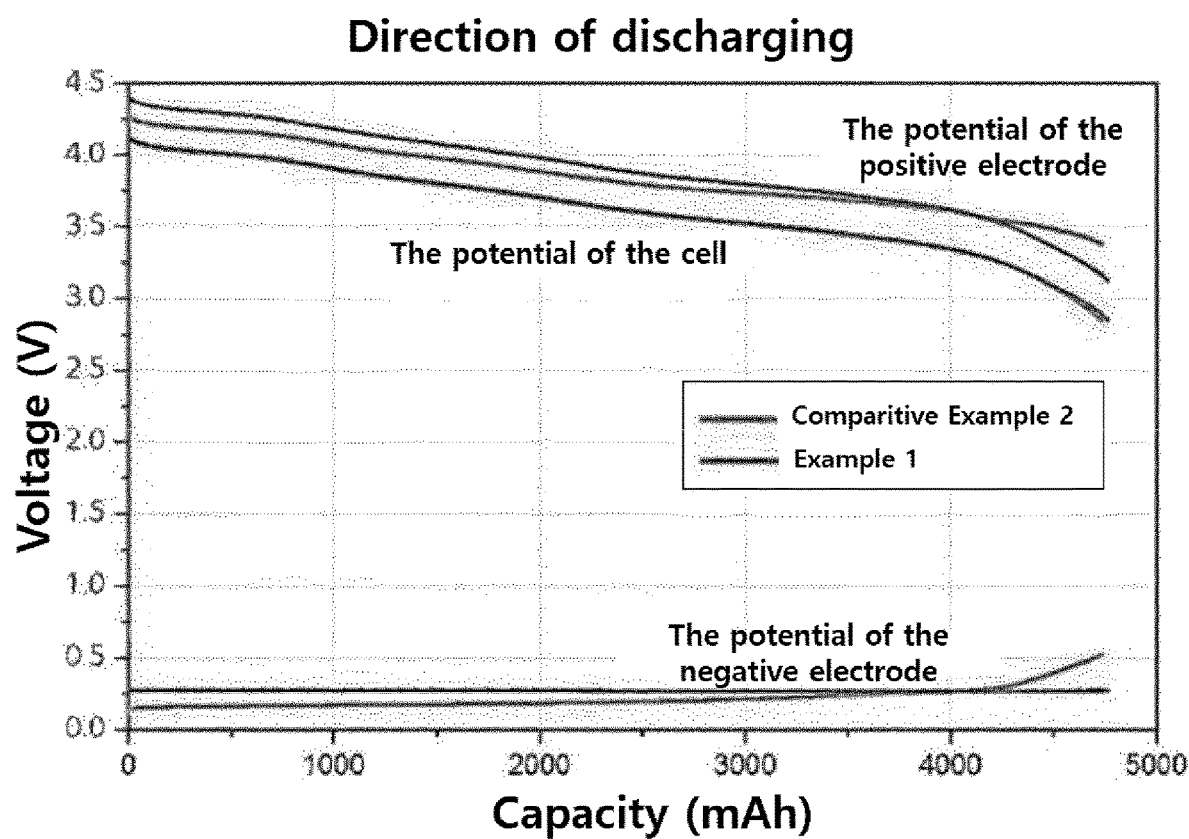

[Fig. 10]
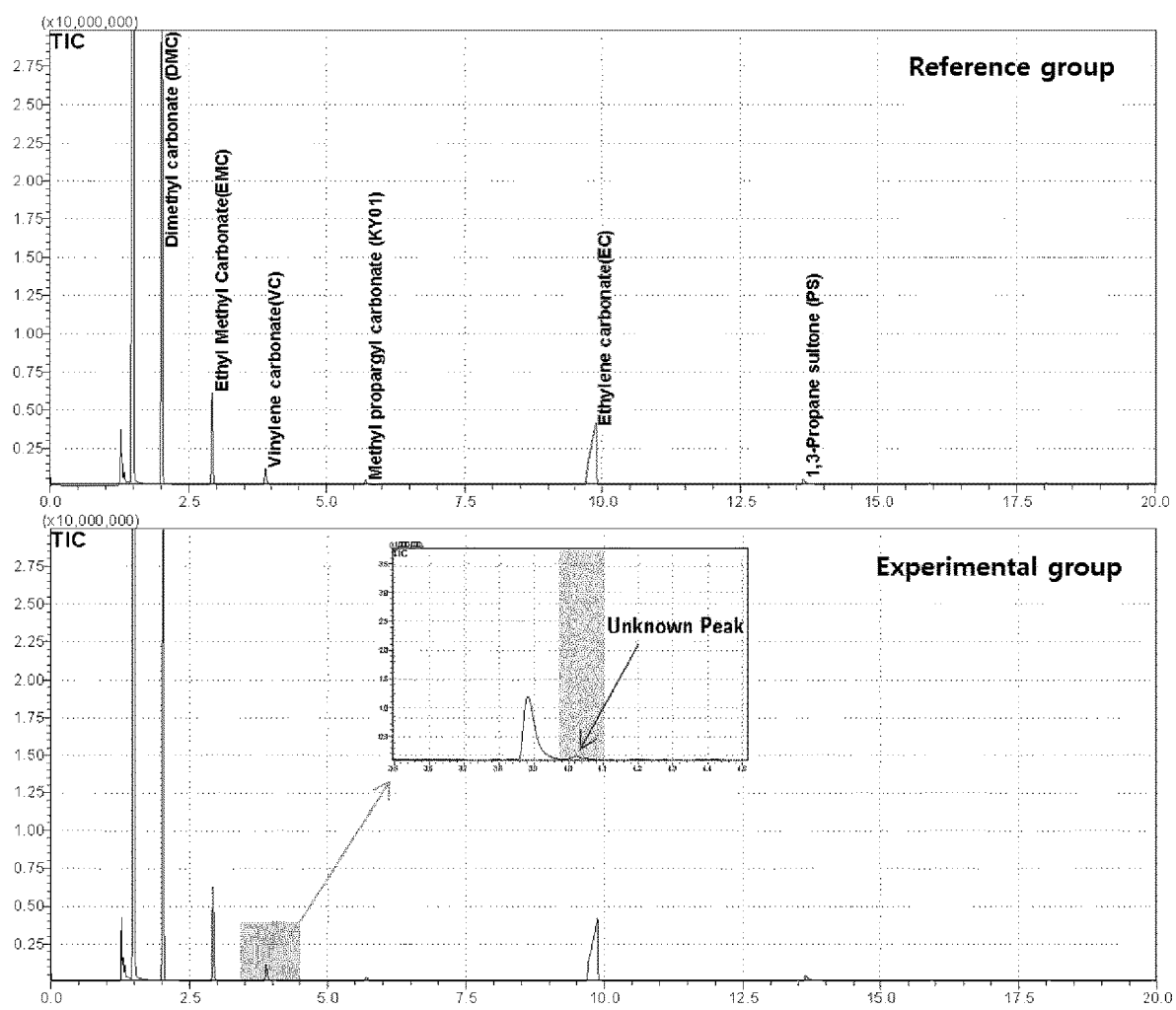

METHOD FOR MANUFACTURING CYLINDRICAL THREE-ELECTRODE CELL, AND CYLINDRICAL THREE-ELECTRODE CELL MANUFACTURED THEREBY

TECHNICAL FIELD

This application claims the benefit of priority based on Korean Patent Application No. 10-2018-0101846, filed on Aug. 29, 2018, and the entire contents of the Korean patent application are incorporated herein by reference.

The present invention relates to method for manufacturing a cylindrical trielectrode cell, and a cylindrical trielectrode cell manufactured thereby

BACKGROUND ART

With the development of technology and demand for mobile devices, the demand for batteries as energy sources is rapidly increasing, and accordingly, a lot of researches on batteries capable of meeting various demands have been conducted.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having advantages such as high energy density, discharge voltage, and output stability.

On the other hand, the electrode potential of the battery is measured to develop a new battery cell and check the performance of the manufactured battery cell. In order to measure the electrode potential, a three-electrode-based electrode potential measuring method consisting of a reference electrode, a working electrode, and a potential electrode is mainly used.

The reference electrode is an electrode used to make a battery circuit for electrode potential measurement in combination with the electrode in order to measure the potential of the electrode constituting the battery or the electrode where electrolysis is occurring, and the reference electrode becomes a reference for potential when measuring the relative value of electrode potential.

When the reference electrode is applied to a pouch type lithium secondary battery, an electrode assembly, in which a positive electrode, a separator, and a negative electrode are repeatedly stacked, is generally accommodated together with an electrolyte in a pouch case, and then the edge of the pouch case is heat-sealed while the electrode lead connected to the electrode assembly is drawn out of the pouch case, to thereby prepare a pouch type three electrode cell.

On the other hand, there is currently no standardized method for applying a reference electrode to a cylindrical battery in which the electrode assembly is embedded in a cylindrical can.

As such, in order to manufacture the cylindrical trielectrode cell, a method of injecting an excessive amount of electrolyte using a container other than the cylindrical can is used. However, in this method, electrolyte is discolored due to insufficient sealing, excess salt overloads the negative electrode, and the internal interface resistance increases, so that the resistance of the electrode is measured higher than the actual value, which makes it difficult to obtain reliable data.

DISCLOSURE

Technical Problem

An object of the present invention is to provide a method for manufacturing a cylindrical trielectrode cell capable of maintaining the original shape and structure of a cylindrical cell and accurately measuring electrode potential of a secondary battery, and a cylindrical trielectrode cell manufactured thereby.

Technical Solution

A method of manufacturing a cylindrical trielectrode cell according to an example of the present invention may include a step of preparing a cylindrical can having an electrode assembly housed therein, a step of manufacturing a reference electrode assembly by coupling lithium metal to one side of a reference electrode lead, a step of separating the cap assembly coupled to an open top end of the cylindrical can, a step of inserting the reference electrode assembly such that the lithium metal is inserted into the electrode assembly and one side of the reference electrode lead is drawn out of the cylindrical can, a step of coupling the separated cap assembly to the open top end of the cylindrical can, a step of mounting a holder to surround a side surface of the cap assembly and a side surface end of the cylindrical can, and a step of putting an adhesive inside the holder and hardening the adhesive.

Herein, the step of manufacturing the reference electrode assembly may include a step of preparing a reference electrode lead insulated and coated with two metal wires, a step of partially removing the insulating coating at both ends of the reference electrode lead, and a step of wrapping one end of the reference electrode lead, from which the insulating coating has been removed, with lithium metal.

Further, the method may further include a step of sealing one end of the reference electrode lead drawn out of the cylindrical can with an adhesive.

Further, after the step of manufacturing the reference electrode assembly, the method may further include a step of injecting an electrolyte into the cylindrical can and a step of measuring potentials of the cell and the positive electrode and the negative electrode of the electrode assembly.

The holder may include a space to receive the adhesive between the side of the cap assembly and the side end of the cylindrical can.

The diameter of the upper end of the holder may be larger than the diameter of the cap assembly, and the diameter of the lower end of the holder may correspond to the diameter of the cylindrical can.

The adhesive may be a room temperature curable adhesive, the initial curing time of the adhesive may be within 3 minutes, and the adhesive may be a hybrid adhesive including a cyanoacrylate-based instant adhesive and an epoxy-based adhesive.

Meanwhile, a cylindrical trielectrode cell according to an example of the present invention may be manufactured by the above manufacturing method.

A cylindrical trielectrode cell according to an example of the present invention may include: an electrode assembly; a cylindrical can accommodating the electrode assembly; a cap assembly coupled to an open top end of the cylindrical can; a holder disposed to surround a side surface of the cap assembly and a side end of the cylindrical can and receiving a sealing unit; and a reference electrode assembly in which one side is inserted into the inside of the electrode assembly and the other side is drawn out of the cylindrical can.

Further, the reference electrode assembly may include a reference electrode lead; and a lithium metal coupled to one side of the reference electrode lead and inserted into the electrode assembly.

The reference electrode lead may be a thermocouple insulated with two metal wires, and insulating coatings of one side of the reference electrode lead to which the lithium metal is coupled and the other side which is drawn out of the cylindrical can may have been removed.

The cap assembly may be inserted into the open top end of the cylindrical can in an interference fit.

The cap assembly may be mounted on an open top end of the cylindrical can and include an upper cap as a protruding electrode terminal.

The electrode assembly may be a jelly-roll structure including a positive electrode, a separator and a negative electrode.

The negative electrode tab and the positive electrode tab of the electrode assembly may be coupled by spot welding with the cylindrical can and the cap assembly, respectively.

Advantageous Effects

According to an embodiment of the present invention, after disassembling the cylindrical cell, the reference electrode is introduced therein and a small amount of electrolyte is added to seal the cylindrical cell again, thereby maintaining the original shape and structure of the cylindrical cell.

In addition, by adding only a small amount of the electrolyte compared to the conventional one, it is possible to solve the increase in the internal interface resistance due to the excessive amount of the electrolyte, thereby measuring the accurate electrode potential of the battery, which improves the reliability of the measured electrode potential.

In addition, by mounting a holder to surround the sealing portion of the cylindrical trielectrode cell, it is possible to prevent the uncured adhesive from flowing down to the bottom by gravity in the process of adding the adhesive, the amount of adhesive applied during manufacture can be constant, and the sealing force can be improved by double sealing with the holder and the sealing part in the joint portion of the cylindrical can and cap assembly.

BRIEF DESCRIPTION OF THE DRAWINGS

FIG. 1 is a schematic diagram of a vertical cross-sectional perspective view of a typical cylindrical cell containing a jelly-roll electrode assembly.

FIG. 2 is a perspective view illustrating a reference electrode assembly according to an embodiment of the present invention.

FIG. 3 is a schematic view of a vertical cross-sectional perspective view of a cylindrical trielectrode cell according to an embodiment of the present invention.

FIG. 4 is a perspective view illustrating a step of mounting a holder on a cylindrical can in the method of manufacturing a cylindrical trielectrode cell according to an embodiment of the present invention.

FIGS. 5 and 6 are perspective views of a cylindrical trielectrode cell according to an embodiment of the present invention.

FIG. 7 is a cross-sectional view taken along line I-I' of FIG. 6.

FIGS. 8 and 9 show capacity-voltage graphs of cylindrical trielectrode cells prepared in Example 1 and Comparative Example 2, respectively.

FIG. 10 shows the results of gas chromatograph-mass spectrometer (GC-MS) analysis of the adhesive-electrolyte according to the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In describing the drawings, similar reference numerals are used for similar elements. In the accompanying drawings, the dimensions of the structures are shown in an enlarged scale for clarity of the invention. Terms such as "first" and "second" may be used to describe various components, but the components should not be limited by the terms. The terms are used only for the purpose of distinguishing one component from another. For example, without departing from the scope of the present invention, a first component may be referred to as a second component, and similarly, the second component may also be referred to as the first component. Singular expressions include plural expressions unless the context clearly indicates otherwise.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, a method of manufacturing a cylindrical trielectrode cell according to an embodiment of the present invention will be described with reference to the drawings.

FIG. 1 is a schematic diagram of a vertical cross-sectional perspective view of a typical cylindrical cell containing a jelly-roll electrode assembly, FIG. 2 is a perspective view illustrating a reference electrode assembly according to an embodiment of the present invention, and FIG. 3 is a schematic view of a vertical cross-sectional perspective view of a cylindrical trielectrode cell according to an embodiment of the present invention.

A method of manufacturing a cylindrical trielectrode cell 100 according to an example may include: a step S100 of preparing a cylindrical can 110 having an electrode assembly 120 housed therein; a step S200 of manufacturing a reference electrode assembly 130 by coupling lithium metal 132 to one side of a reference electrode lead 131; a step S300 of separating the cap assembly 140 coupled to an open top end of the cylindrical can 110; a step S400 of inserting the reference electrode assembly 130 such that the lithium metal is inserted into the electrode assembly 120 and the other side of the reference electrode lead 131 is drawn out of the cylindrical can 110; a step S500 of coupling the separated cap assembly 140 to the open top end of the cylindrical can 110; a step S600 of mounting a holder 200 to surround a side surface of the cap assembly 140 and a side surface end of the cylindrical can 110; and a step S700 of putting an adhesive inside the holder 200 and hardening the adhesive.

The step S100 of preparing a cylindrical can 110 having an electrode assembly 120 housed therein may be a step of preparing a cylindrical can 110 for manufacturing a cylindrical trielectrode cell. Referring to FIG. 1, the jelly-roll type (wound) electrode assembly 120 is accommodated in a receiving unit of the cylindrical can 110, the electrolyte is injected into the receiving unit so that the electrode assembly 120 is completely immersed in the cylindrical can 110, and the cap assembly 140 is mounted and coupled to an open top end of the cylindrical can 110.

The electrode assembly 120 has a structure in which a positive electrode 121, a separator 122, and a negative electrode 123 are sequentially stacked and wound in a round shape, and a cylindrical center pin (not shown) may be inserted into the center of the electrode assembly 110. The center pin is generally made of a metal material to impart a predetermined strength, and has a hollow cylindrical structure in which a plate is rounded. In some cases, the center pin may be removed after welding the electrode of the electrode assembly 120 to the cylindrical can 110 or the cap assembly 140.

The cap assembly 140 has a structure in which the upper cap 141 and the internal pressure drop safety vent are in close contact with each other at the inside of the airtight gasket mounted on the upper inner surface of the crimping part and the beading part 150 of the cylindrical can 110, the upper cap 141 protrudes upward and serves as a positive electrode, and a plurality of through-holes through which the gas inside the can may be discharged may be formed along the periphery of the protrusion. In addition, a positive electrode tab 142 protrudes from the insulating plate in the upper axial direction at the center of the electrode assembly 120 to be electrically connected to the upper cap 141 of the cap assembly 140 to apply an electric current.

A safety vent is a thin film structure through which a current flows, and a central portion thereof is recessed to form an indented central portion, and two notches reaching depths are formed at the upper and lower bending portions of the central portion.

An insulating plate is mounted on the upper surface of the electrode assembly 120 to prevent contact with the electrode lead, thereby preventing a short circuit due to contact between the electrode assembly 120 and the electrode lead.

The step S200 of manufacturing the reference electrode assembly 130 by combining the lithium metal 132 to one side of the reference electrode lead 131 may be a step of manufacturing a reference electrode assembly 130 that is installed to independently measure the potential of each of the positive electrode and the negative electrode of the battery.

Referring to FIG. 2, the step of manufacturing the reference electrode assembly 130 (S200) may include preparing a reference electrode lead 131 having two metal wires 131a and 132b having an insulating coating 131c, partially removing the insulating coating 131c at both ends of the reference electrode lead 131, and wrapping one end portion in the longitudinal direction of the reference electrode lead 131, from which the insulating coating 131c has been removed, with the lithium metal 132, but is not limited thereto.

At this time, in the step of wrapping one end of the reference electrode lead 131, from which the insulating coating 131c has been removed, with the lithium metal 132, the lithium metal 132 is disposed at one end of the reference electrode lead 131, from which the insulating coating 131c has been removed, that is, between the two metal wires 131a and 131b, and the two metal wires 131a and 131b are twisted a predetermined number of times and then the lithium metal 132 is twisted, thereby increasing the coupling force between the reference electrode lead 131 and the lithium metal 13.

Meanwhile, the material of the metal wires 131a and 131b is not particularly limited as long as it is a metal material having excellent conductivity, and for example, copper (Cu) or nickel (Ni) coated copper may be applied. When nickel (Ni)-coated copper is applied as the metal wire, it is possible not only to have excellent conductivity due to copper, but also to have excellent corrosion resistance due to nickel coated on the surface of copper.

In addition, the insulating coating 131c of the reference electrode lead 131 prevents a short circuit caused by contact of the reference electrode lead 131 with the electrode assembly 120 and may be formed to surround the two metal wires 131a and 131b.

The step S300 of separating the cap assembly 140 coupled to the open top end of the cylindrical can 110 may be a preparation step for inserting the reference electrode assembly 130 inside the electrode assembly 120 accommodated in the cylindrical can 110. The cap assembly 140 may be separated by cutting the beading part 150 of the cylindrical can 110 using a cutter such as a pipe cutter, but is not limited thereto.

Referring to FIG. 3, the step S400 of inserting the reference electrode assembly 130 may be a step in which the lithium metal 132 coupled to the reference electrode lead 131 is inserted into the electrode assembly 120, and the other side of the reference electrode lead 131 is inserted to be drawn out of the cylindrical can 110.

In FIG. 3, a portion of the separated cap assembly 140 and the reference electrode lead 131 drawn out of the cylindrical can are omitted, but the separated cap assembly 140 may be connected to the positive electrode tab 142.

In addition, the reference electrode lead 131 inserted into the electrode assembly 120 is preferably disposed to be spaced apart from the bottom of the cylindrical can 110 in order to prevent contact with the bottom of the cylindrical can 110, as illustrated in FIG. 3. In addition, although not shown in the drawing, in another embodiment for preventing contact with the bottom of the cylindrical can 110, a method of wrapping the reference electrode lead 131 inserted into the electrode assembly 120 with an insulating film may be used. As the reference electrode lead 131 inserted into the electrode assembly 120 is wrapped with the insulating layer, a short circuit by the contact of the reference electrode lead 131 with the electrode assembly 120 and the cylindrical can 110 may be prevented. Such an insulating film may be made of polyimide tate, but is not limited thereto.

A positive electrode tab 142 protrudes from the insulating plate in the upper axial direction at the center of the electrode assembly 120 to be electrically connected to the upper cap 141 of the cap assembly 140 to apply an electric current.

When the lithium metal 132 coupled to the reference electrode lead 131 is inserted into the electrode assembly 120, a distance deviation between each of the positive electrode 121 and the negative electrode 123 and the reference electrode assembly 130 disappears. Therefore, when measuring the potentials of the positive electrode 121 and the negative electrode 123 of the secondary battery separately, more accurate measurement is possible, thereby improving accuracy in evaluating the characteristics of the secondary battery.

In addition, the lithium metal 132 coupled to the reference electrode lead 131 may be preferably located at the center of the electrode assembly 120. As such, when the lithium metal 132 is positioned at the center of the electrode assembly 120, the distance deviation between each of the pair of electrode leads and the lithium metal 132 is also eliminated, thereby further improving the accuracy of the characteristic evaluation of the secondary battery.

Meanwhile, the electrolyte inside the cell rises along the empty space of the reference electrode lead 131 inserted into the electrode assembly 120 due to the capillary phenomenon and leaks to the reference electrode lead 131 drawn out of the cylindrical can 110. In order to prevent such a leakage phenomenon, the method may further include sealing one end of the reference electrode lead 131 drawn out of the cylindrical can 110 with an adhesive.

The method may further include inserting the reference electrode assembly 130, and then injecting an electrolyte into the cylindrical can 110; and measuring a potential of the positive electrode 121 and the negative electrode 123 of the electrode assembly 120 and the cell 100.

At this time, the same electrolyte as the electrolyte already injected into the cylindrical cell is added, and only a small amount of 1 to 2 mL, preferably 0.2 to 0.5 mL can be added. In the manufacturing method of the cylindrical trielectrode cell 100 according to the present invention, after disassembling the cylindrical cell, the reference electrode assembly 130 is put into the inside, and the cylindrical cell is sealed again, so that only a small amount of electrolyte is added before sealing. As a result, it is possible to solve the increase in the internal interface resistance due to the excessive input of the electrolyte, and the reliability of the measured electrode potential can be improved.

Non-limiting examples of the electrolyte may be a non-aqueous electrolyte, an organic solid electrolyte, an inorganic solid electrolyte, or the like.

Non-limiting examples of the non-aqueous liquid electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$, and $Li_3PO_4$—$Li_2S$—$SiS_2$.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

The step S500 of coupling the separated cap assembly 140 to the open top end of the cylindrical can 110 may be a step of maintaining the shape and structure of the original cylindrical cell by recombining the separated cap assembly 140. The separated cap assembly 140 may be inserted into and coupled to the open top end of the cylindrical can 110 by an interference fit method.

FIG. 4 is a perspective view illustrating a step of mounting a holder on a cylindrical can in the method of manufacturing a cylindrical trielectrode cell according to an embodiment of the present invention, FIGS. 5 and 6 are perspective views of a cylindrical trielectrode cell according to an embodiment of the present invention, and FIG. 7 is a cross-sectional view taken along line I-I' of FIG. 6.

Thereafter, referring to FIGS. 4 to 7, the method may include a step S600 of mounting the holder 200 to surround the side surface of the cap assembly 140 and the side surface end of cylindrical can 110 and injecting an adhesive into the inside 210 of the holder 200 and then curing the adhesive.

In the step S600 of mounting the holder 200, it is preferable to mount the holder 200 such that the upper end of the holder 200 and the upper end of the cap assembly 140 are aligned.

The holder 200 may include a space 210 for receiving the adhesive between the side of cap assembly 140 and the side end of cylindrical can 110. In this case, the diameter d1 of the upper end of the holder 200 is preferably larger than the diameter d2 of the cylindrical can 110, and the diameter d2 of the lower end of the holder 200 preferably corresponds to the diameter d2 of the cylindrical can 110. By having such a diameter, it is possible to prevent the uncured adhesive from flowing down to the lower end by gravity in the process of adding the adhesive. In addition, by injecting the adhesive as much as the inner space 210 of the holder 200, the amount of the adhesive may be constant during manufacturing. In addition, the sealing force can be improved by double sealing the coupling portion of the cylindrical can 110 and the cap assembly 140 with the holder 200 and the adhesive, thereby preventing discoloration of the electrolyte.

On the other hand, the material of the holder 200 is not particularly limited, but is preferably a polycarbonate material in consideration of the adhesive strength to the adhesive described later.

Moreover, the adhesive is not particularly limited as long as it is a conventional curable adhesive, but it is preferable to use a room temperature curable adhesive whose initial curing time is within 3 minutes in consideration of the curing method and time. Examples thereof include a hybrid adhesive including a cyanoacrylate instant adhesive and an epoxy adhesive, but they are not limited thereto. In addition, it is preferable that the adhesive exhibits high strength even at high temperatures and can withstand large loads for a long time.

Hereinafter, a cylindrical trielectrode cell according to an embodiment of the present invention will be described with reference to the drawings.

As illustrated in FIGS. 2 to 7, the cylindrical trielectrode cell 100 may include an electrode assembly 120; a cylindrical can 110 in which the electrode assembly 120 is accommodated; a cap assembly 140 coupled to the open top end of the cylindrical can 110; a holder 200 which is disposed to surround the side of the cap assembly 140 and the side end of the cylindrical can 110 and in which the sealing portion 210 is received; and a reference electrode assembly 130 having one side inserted into the electrode assembly 120 and the other side drawn out of the cylindrical can 110.

Meanwhile, the cylindrical trielectrode cell 100 of the present invention may be manufactured by the above-described manufacturing method, and overlapping description thereof will be omitted.

The electrode assembly 120 has a jelly-roll structure wound in a round shape by stacking the positive electrode 121, the separator 122, and the negative electrode 123 in sequence, and a duplicate description of the electrode assembly 120 will be omitted.

The positive electrode 121 is prepared by applying a mixture of a positive electrode active material, a conductive material and a binder on a positive electrode current collector, followed by drying. If necessary, a filler may be further added to the mixture.

The positive electrode active material may be a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (herein, x is between 0 and 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}M_xO_2$ (herein, M=Co, Mn, Al, Cu, Fe, Mg, B or Ga, and x=0.01 to 0.3); a lithium manganese compound oxide expressed by $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ in which a part of Li is substituted with an alkaline earth metal ion; disulfide compounds; $Fe_2(MoO_4)_3$, etc., but not limited thereto.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like, but the present invention is not limited to these examples.

The binder is added in an amount of 1 to 30% by weight, on the basis of the total weight of the mixture containing the positive electrode active material, as a component that assists in bonding between the active material and the conductive material and bonding to the current collector. Non-limiting examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

The negative electrode 123 may be formed by coating a negative electrode active material on a negative electrode collector and drying the negative electrode active material. Optionally, the negative electrode may further include the above-described components.

Examples of the negative electrode active material include carbon such as non-graphitized carbon and graphite carbon; metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, groups 1, 2, and 3 of the periodic table, halogen; $0 < x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The separator 122 may be formed of an insulating thin film having high ion permeability and mechanical strength. The process diameter of the separator is generally between 0.01 and 10 μm, the thickness may be between 5 and 300 μm. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The cylindrical can 110 may be made of metal, preferably made of stainless steel. In addition, the cylindrical can 110 may include a receiving unit in which the electrode assembly 120 may be accommodated, and the upper end part may be open.

The cap assembly 140 may be inserted into and coupled to the open top end of the cylindrical can 110 by an interference fit method. Further, the cap assembly 140 has a structure in which the upper cap and the internal pressure drop safety vent are in close contact with each other at the inside of the airtight gasket mounted on the upper inner surface of the crimping part and the beading part of the cylindrical can 110, the upper cap protrudes upward and serves as a positive electrode, and a plurality of through-holes through which the gas inside the can may be discharged may be formed along the periphery of the protrusion.

On the other hand, the positive electrode tab of the electrode assembly 120 is protruded in the upper axial direction from the insulating plate to be coupled to the upper cap of the cap assembly by spot welding and may be electrically connected to make the electricity. In addition, the negative electrode tab of the electrode assembly may be spot welded to the lower inner surface of the cylindrical can and electrically connected to apply electric current.

The holder 200 may be disposed to surround all of the side surfaces of the cap assembly 140 and to surround the side ends of the cylindrical can 110. The holder 200 may include a space 210 for receiving the adhesive between the side of cap assembly 140 and the side end of cylindrical can 110.

In this case, the diameter d1 of the upper end of the holder 200 is preferably larger than the diameter d2 of the cylindrical can 110, and the diameter d2 of the lower end of the holder 200 preferably corresponds to the diameter d2 of the cylindrical can 110. The material of the holder 200 is not particularly limited, but is preferably a polycarbonate material in consideration of the adhesive strength to the adhesive.

On the other hand, the sealing unit 210 may be made of a conventional curable adhesive, but preferably, it may be made of a room temperature curable adhesive having an initial curing time of less than 3 minutes in consideration of the curing method and time, etc., One side of the reference electrode assembly 130 may be inserted into the inside of the electrode assembly 120, and the other side thereof may be drawn out of the cylindrical can 110. Specifically, the reference electrode assembly 130 may include a reference electrode lead 131 and a lithium metal 132 coupled to one side of the reference electrode lead 131 and inserted into the electrode assembly 120.

Lithium ions generated from the lithium metal 132 inserted into the electrode assembly 120 are moved through the electrolyte filled in the cylindrical can 110, and thus the potential of the positive electrode or the negative electrode (relative potentials based on lithium metal) can be measured individually.

In addition, the reference electrode lead 131 is preferably a thermocouple having two metal wires 131a and 131b having an insulating coating 131c. The insulating coating 131c of the reference electrode lead 131 may prevent the reference electrode lead 131 from coming into contact with the electrode assembly 120 which may result in a short circuit. On the other hand, one side of the reference electrode lead 131 to which the lithium metal 132 is coupled and the other side which is drawn out to the outside of the cylindrical can 110 may have a form in which metal wires 131a and 131b are exposed by removing the insulating coating 131c.

One side of the reference electrode assembly 130 inserted into the electrode assembly 120 may further include an insulating film wrapped with an insulating film. The insulating film may prevent the reference electrode lead 131 and the lithium metal 132 from contacting the electrode assembly 120 which may lead to a short circuit. In this case, the insulating film may be made of the same material as the separator 122 provided in the electrode assembly 120.

Meanwhile, the electrolyte inside the cell rises along the empty space of the reference electrode lead 131 inserted into the electrode assembly 120 due to the capillary phenomenon and leaks to the reference electrode lead 131 drawn out of the cylindrical can 110. In order to prevent such a leakage phenomenon, the method may further include a sealing unit (not shown) for surrounding one end of the reference electrode lead 131 drawn out of the cylindrical can 110.

Hereinafter, the present invention will be described in detail with reference to Examples, but the following Examples are merely to illustrate the present invention, and the present invention is not limited by the following Examples.

Example 1

A cylindrical can and a thermocouple in which the electrode assembly was housed were prepared. Subsequently, the insulating coating at both ends of the prepared thermocouple was peeled off by a predetermined length, the lithium metal was placed between the stripped thermocouple, the wire was twisted three times, and the reference electrode assembly was prepared by twisting the lithium metal.

The cap assembly coupled to the open top end of the prepared cylindrical can was cut using a pipe cutter. Thereafter, the reference electrode assembly was inserted to insert lithium metal in the center of the electrode assembly, 0.25 mL of electrolyte was added into the cylindrical can, and the separated cap assembly was coupled to the open top end of the cylindrical can. At this time, one side of the lead of the reference electrode assembly was drawn out to the outside of the cylindrical can. The holder was mounted to surround the side of the cap assembly and the side end of the cylindrical can, and a cylindrical trielectrode cell was prepared by putting an adhesive (Loctite 4090) inside the holder and curing the adhesive at room temperature. Subsequently, an adhesive (Loctite 4090) was further applied to one end of the reference electrode lead drawn out of the cylindrical can and the adhesive was cured.

Comparative Example 1

After the separated cap assembly is joined to the open top end of the cylindrical can, a cylindrical trielectrode cell was manufactured through the same process as in Example 1, except for applying an adhesive to the joint of the cap assembly and the cylindrical can without the holder mounted and curing the adhesive.

Comparative Example 2

Caps were prepared to seal a cylindrical plastic container and the open top of the container. The reference electrode, the positive electrode terminal, and the negative electrode terminal were inserted through the holes drilled in the cap. At this time, the Teflon assembly for fixing the electrode group in a plastic container was built. Then, after bonding the positive electrode sheet and the negative electrode sheet to each terminal, the electrolyte is injected to the extent that both the reference electrode and the electrode group are immersed inside the plastic container, and the cap is coupled to the open top end of the plastic container to seal the cylindrical triode and thereby prepare a cylindrical trielectrode cell.

Experimental Example 1

For each of the cylindrical trielectrode cells prepared in Example 1 and Comparative Example 2, charging/discharging was repeated under the same conditions to measure the potential at 50 cycles, and the results are shown in FIGS. 8 and 9.

Specifically, in FIG. 8, Example 1 and Comparative Example 2 show the same cell potential, but when the positive/negative electrode potentials are compared, it can be seen that Comparative Example 2 shows higher values than in Example 1 in both the positive and negative electrode potentials at a capacity of 1000 mAh or less, That is, since Comparative Example 2 shows higher values than in Example 1 in both positive/negative electrodes relative to the reference potential, it means that overpotential occurs in Comparative Example 2, and thus it is difficult to accurately measure the positive/negative electrode potential. On the other hand, Example 1, which has less overpotential than Comparative Example 2, has an advantage of accurately measuring the positive/negative electrode potential.

Therefore, as can be seen in FIGS. 8 and 9, in the case of the cylindrical trielectrode cell prepared in Example 1, both positive electrode and negative electrode was found to be superior in terms of over potential compared to Comparative Example 2. As a result, in Example 1, accurate electrode potential of the battery may be measured, and thus reliability of the measured electrode potential may be improved.

Experimental Example 2

In order to check the electrolyte-adhesive reactivity of the cylindrical trielectrode cell, the adhesive was added to the container, and after initial curing for 3 minutes, 10 mL of the electrolyte was added and left in a dry room for 5 days, and then gas chromatograph-mass spectrometer (GC-MS) analysis was performed.

In this case, the gas chromatograph-mass spectrometer (GC-MS) analysis was also performed on the electrolyte without the adhesive as the reference control group, and the results are shown in FIG. 10.

As can be seen in FIG. 10, a peak was observed at an RT (remaining time) of 4.025 minutes (experimental group), but It was found that it did not affect the battery in a very small amount, about 0.1% or less of the total peak area. This is an experiment through the direct reaction of the adhesive and the electrolyte, and as in Example 1, since the adhesive comes into contact with the vaporized electrolyte and the beading part area, it is expected that there will be stability to the electrolyte-adhesive.

Experimental Example 3

In order to confirm the electrolyte leakage of the cylindrical trielectrode cells prepared in Example 1 and Comparative Example 1, the cylindrical trielectrode cells were stored for 13 days at 55° C., and the weight loss compared to the initial cell was shown in the following table 1.

TABLE 1

|  |  | Day 1 | Day 2 | Day 5 | Day 6 | Day 9 | Day 13 |
| --- | --- | --- | --- | --- | --- | --- | --- |
| Example 1 | Sample 1 | 0.009 g | 0.009 g | — | — | — | — |
|  | Sample 2 | 0.011 g | 0.011 g | — | — | — | — |
|  | Average | 0.010 g | 0.010 g | — | — | — | — |
| Comparative Example 1 | Sample 1 | 0.057 g | 0.114 g | 0.122 g | 0.126 g | 0.138 g | 0.233 g |
|  | Sample 2 | 0.190 g | 0.380 g | 0.384 g | 0.388 g | 0.503 g | 1.024 g |
|  | Average | 0.124 g | 0.247 g | 0.253 g | 0.257 g | 0.321 g | 0.629 g |

As can be seen in Table 1, the cylindrical trielectrode cell prepared in Example 1 seals one end of the reference electrode lead drawn out to the outside of the cylindrical can with an adhesive, and it prevents a phenomenon that the electrolyte inside the cell rises along the empty space of the reference electrode lead inserted into the electrode assembly due to the capillary phenomenon and leaks to the reference electrode lead drawn out of the cylindrical can. As such, in the second day of preservation, the weight loss amount was the same as that of the first day, and thus the weight loss did not occur and the electrolyte leakage was prevented.

On the other hand, in Comparative Example 1, the electrolyte may be leaked to the reference electrode lead drawn out of the cylindrical can, and thus, it was found that a continuous weight loss occurred.

Although the above has been described with reference to a preferred embodiment of the present invention, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF SYMBOLS

100: cylindrical trielectrode cell
110: cylindrical can
120: electrode assembly
130: reference electrode assembly
140: cap assembly
200: holder

The invention claimed is:

1. A method of manufacturing a cylindrical trielectrode cell, the method comprising:
 preparing a cylindrical can having an electrode assembly housed therein, and a cap assembly coupled to an open top end of the cylindrical can;
 manufacturing a reference electrode assembly by coupling lithium metal to one end of the reference electrode lead;
 separating the cap assembly from the cylindrical can;
 inserting the reference electrode assembly such that the lithium metal is inserted into the electrode assembly and an opposite end of the reference electrode lead is drawn out of the cylindrical can;
 coupling the cap assembly to the open top end of the cylindrical can;
 mounting a holder to surround a side surface of the cap assembly and only a portion of a side surface of the cylindrical can and having an open space receiving a sealing unit; and
 putting an adhesive inside the holder and hardening the adhesive.

2. The method of claim 1, wherein the manufacturing the reference electrode assembly comprises:
 preparing the reference electrode lead insulated and coated with two metal wires to obtain an insulating coating;
 partially removing the insulating coating at both ends of the reference electrode lead; and
 wrapping the one end of the reference electrode lead, from which the insulating coating has been removed, with the lithium metal.

3. The method of claim 1, further comprising sealing the opposite end of the reference electrode lead drawn out of the cylindrical can with an adhesive.

4. The method of claim 1, after the manufacturing the reference electrode assembly, further comprising:

injecting an electrolyte into the cylindrical can; and measuring potentials of a cell and a positive electrode and a negative electrode of the electrode assembly.

5. The method of claim 1, wherein the holder includes a space to receive the adhesive between the side surface of the cap assembly and the side surface end of the cylindrical can.

6. The method of claim 1, wherein a diameter of an upper end of the holder is larger than a diameter of the cap assembly, and a diameter of the lower end of the holder corresponds to a diameter of the cylindrical can.

7. The method of claim 1, wherein the adhesive is curable at room temperature, has an initial curing time of within 3 minutes, and comprises a hybrid adhesive including a cyanoacrylate-based instant adhesive and an epoxy-based adhesive.

8. A cylindrical trielectrode cell comprising:

an electrode assembly;

a cylindrical can accommodating the electrode assembly;

a cap assembly coupled to an open top end of the cylindrical can;

a holder disposed to surround a side surface of the cap assembly and only a portion of a side surface of the cylindrical can and having an open space receiving a sealing unit; and a reference electrode assembly in which one end is inserted into an inside of the electrode assembly and an opposite end is drawn out of the cylindrical can.

9. The cylindrical trielectrode cell of claim 8, wherein the reference electrode assembly includes a reference electrode lead; and a lithium metal coupled to the one end of the reference electrode lead and inserted into the electrode assembly.

10. The cylindrical trielectrode cell of claim 9, wherein the reference electrode lead comprises a thermocouple insulated with two metal wires, and wherein the one end of the reference electrode lead to which the lithium metal is coupled and the opposite end which is drawn out of the cylindrical can do not have insulating coating.

11. The cylindrical trielectrode cell of claim 8, wherein the cap assembly is inserted into the open top end of the cylindrical can in an interference fit.

12. The cylindrical trielectrode cell of claim 8, wherein the cap assembly is mounted on the open top end of the cylindrical can, and includes an upper cap as a protruding electrode terminal.

13. The cylindrical trielectrode cell of claim 8, wherein the electrode assembly is a jelly-roll structure including a positive electrode, a separator and a negative electrode.

14. The cylindrical trielectrode cell of claim 13, wherein a negative electrode tab and a positive electrode tab of the electrode assembly are coupled by spot welding with the cylindrical can and the cap assembly, respectively.

15. The cylindrical trielectrode cell of claim 8, wherein a diameter of the upper end of the holder is larger than a diameter of the cap assembly, and a diameter of the lower end of the holder corresponds to a diameter of the cylindrical can.

16. The cylindrical trielectrode cell of claim 8, wherein the space receiving the sealing unit is between the side surface of the cap assembly and the side surface of the cylindrical can.

17. The cylindrical trielectrode cell of claim 8, wherein the space includes an adhesive.

18. The cylindrical trielectrode cell of claim 17, wherein the adhesive comprises a curable adhesive.

* * * * *